Patented June 17, 1941

2,246,037

UNITED STATES PATENT OFFICE 2,246,037

PROCESS FOR THE MANUFACTURE OF UNSATURATED ALDEHYDES

Milton Gallagher, Louisville, Ky., and Rudolph Leonard Hasche, Kingsport, Tenn., assignors to Eastman Kodak Company, Rochester, N. Y., a corporation of New Jersey No Drawing. Application October 5, 1940, Serial No. 359,932

8 Claims. (Cl. 260—601)

This invention relates to the manufacture of unsaturated carbonyl compounds and more particularly to a process for the manufacture of unsaturated aliphatic carbonyl compounds such as acroleins. The unsaturated aliphatic carbonyl compounds are characterized by including a double bond in their carbon atom chain. For example, the unsaturated aldehyde, acrolein, also referred to as acrylic aldehyde, with which this invention is particularly concerned, has the formula: $CH_2=CH.CHO$.

This application is a continuation-in-part of our application 232,160, filed September 28, 1938, which application is a continuation-in-part of our application 88,821, filed July 3, 1936.

Unsaturated carbonyl compounds and, in particular, acroleins have a number of uses. These organic compounds may be converted to other chemical products. For example, acrolein may be converted to propionic aldehyde in accordance with the methods of our U. S. Patent No. 2,150,158, or to acrylic acid, glycerine, or other compounds.

While methods of preparation wherein a single aldehyde combines with itself, are known, apparently few methods have been developed for the manufacture of the unsaturated carbonyl compounds and in particular unsaturated aldehydes. Prior to our invention the manufacture of unsaturated carbonyl compounds has been confined in a number of instances to expensive and unsatisfactory processes. In the instance of acrolein, prior to our invention, acrolein has been prepared, for example, by dehydrating glycerol.

Another method that has been suggested for producing acrolein is to make the mono-chlor substitution product from propylene, then to hydrolyze it to allyl alcohol followed by dehydrogenation to acrolein. However, this has the same objection as the dehydration of glycerol in that the over-all yield is very low.

In Monatshefte fur chemie, volumes 21 and 22, are described a number of methods for reacting two different aldehydes. However, these methods in most instances involve the use of a solution of potassium salts and produce only aldols. Furthermore, the methods indicate that several days may be required in carrying them out and that several steps may be involved.

We have found a new method for the manufacture of unsaturated carbonyl compounds, and in particular unsaturated aldehydes such as acrolein, which is superior in a number of respects to processes previously employed in the manufacture of such carbonyl compounds.

Although our process may in some respects be considered essentially a condensation reaction, splitting off water with formation of an unsaturated carbonyl compound, it may be considered in a number of respects, as being a single step process operating under different temperature and other conditions, as will be more apparent hereinafter.

In our copending applications above identified, we have described the reaction specially as carried out in the presence of a catalyst and wherein the compounds reacted comprise aldehydes. However, our invention has wider applications. While in the preferred embodiment of the invention, the reaction chamber would preferably be filled with a solid material not only functioning to distribute the heat but also functioning in a catalytic capacity, we have found that our reaction can be caused to proceed when carried out in the reaction chamber containing a relatively inert and non-catalytic material. We have further found that when operating without catalytic materials, or with only small amounts thereof that higher temperatures may be employed and preferably would be employed for maximum yields. While our preferred reaction is carried out employing a carbonyl compound such as a lower aliphatic aldehyde, our invention embraces the utilization of other carbonyl compounds having at least two hydrogen atoms on the carbon atom adjacent the carbonyl group, as also described in greater detail hereinafter.

We have found an efficient and highly desirable procedure wherein two different carbonyl compounds may be caused to combine to produce vinyl carbonyl compounds containing a number of carbon atoms equal to the sum of two reactants.

It will be noted that prior art attempts to react two different carbonyl compounds have not resulted in the production of vinyl carbonyl compounds but have either failed outright or resulted in the production of some other compound such as, for example, penta-erythritol from formaldehyde and acetaldehyde.

This invention has for an object to provide a process for the combination of two different carbonyl compounds to produce a vinyl carbonyl compound containing a number of carbon atoms equal to the sum of the two carbonyl reactants. Another object is to provide a novel process for the production of unsaturated aliphatic aldehydes. Still another object is to provide a novel process for the production of unsaturated ketones.

A further object is to provide a process for the reaction at relatively high temperatures of formaldehyde, with another carbonyl compound. Still another object is to provide mechanism and means for carrying out the aforementioned. Other objects will appear hereinafter.

These objects are accomplished by the following invention which includes the step of reacting at least two carbonyl compounds having a different number of carbon atoms in the molecule. In accordance with our preferred procedure, we have found that highly desirable results may be obtained by reacting formaldehyde and another carbonyl compound in accordance with the procedure set forth herein.

In carrying out our process various types of apparatus may be employed and our invention is not limited in this respect. For example, a container would be provided for one of the carbonyl compounds and a second container provided for another of the carbonyl compounds. These units could be connected to separate vaporizers or a single vaporizer. In other words, some means would merely be provided for converting the carbonyl compound to a vapor and the vapors could be substantially mixed in the event that the carbonyl compounds have not been premixed. The vaporizers could then be connected with the reaction chamber of any suitable configuration. A cylindrical chamber would be satisfactory, and in accordance with our preferred embodiment, the reaction chamber would be filled or packed with some material as will be discussed hereinafter. The material may be non-catalytic, catalytic, or a mixture thereof and would function to distribute the reactants and transfer the heat thereto.

Any suitable means for heating, such as electric heat, gas heat, hot oil, or any of the numerous heat transferring compounds may be employed. Also suitable provision may be made for heat exchange or other similar expedients adopted. The discharge from the reaction chamber would preferably be through a condenser or other cooling means.

Inasmuch as suitable apparatus for carrying out our process is described in our companion Patent 2,150,158 and suitable vaporizing units and the like are described in detail in Hasche Patent 2,173,111, further description respecting apparatus appears to be unnecessary.

In the carrying out of our process we have found that two different carbonyl compounds may be readily reacted to form an unsaturated carbonyl compound provided the reaction is caused to take place in the vapor phase. The exact temperatures under which the reaction takes place will depend to some extent upon pressure conditions. Inasmuch as our process functions very satisfactorily under ordinary atmospheric pressures, for simplicity we generally carry our process out under these conditions and usually at a temperature in excess of 200° C. but not greater than about 600° C.

It should be noted, however, that although our reaction may be carried out under a variety of conditions, it is highly desirable that the process be conducted in a substantially continuous single step and under vapor phase conditions. In the preferred operation of our process, the reaction space wherein the two different carbonyl compounds are caused to react in the vapor phase, would preferably be filled with some material which might function merely to distribute the reactants or in addition to this function it might also exert a catalytic function.

In accordance with the preferred operation of our process, as described in detail in our copending application 232,160, the reaction space is filled with a material which functions as a catalyst; for example, various gels have been described as these materials due to their absorptive characteristics, apparently tend to aid in the splitting off of water and therefore may be considered as solid dehydration catalysts.

In more detail, there are a number of other catalysts which have been employed and which function satisfactorily in our process. Among these other catalysts, the following may be mentioned:

The following materials were tried in an amount equal to 2.5% of the weight of the support: $WO_3$ and $V_2O_5$.

Five per cent of catalytic materials were used in the following cases: Formates of Zn, Mg, Cd, Hg, Ca, Ba, Cu, $Ni^{++}$, $Mn^{++}$, and $Co^{++}$. The following acetates were used at 5%: Zn, Mg, Cd, Hg, Ba, Ca, Cu, $Ni^{++}$, $Fe^{++}$, $Mn^{++}$, and Sr.

Five per cent of the following propionates were examined: Mg, Cd, Ca, $Co^{++}$, $Ni^{++}$, Ba, Cd and Zn.

The following were also used at 5%: $Ca(OH)_2$, Mg oxalate, $MgSO_4$, $Mg(NO_3)_2$, $MgCl_2$, $MgCrO_4$, $Tl(NO_3)_4$, $Na_2CO_3$ and $Na(OAc)$.

Ten per cent of the following was used: Acetates of Mg, $Mn^{++}$, Cd, Ba and Na, $MoO_3$, thallium sulfate, $(NH_4)_2Cr_2O_7$, NaCl, $Na_3PO_4$, $NaHAsO_4$, $NaBO_3$, $Na_2B_4O_7$, $Na_2HPO_4$, $NaH_2PO_4$, KCl, $(NH_4)_2MoO_4$, $Be(NO_3)_2$, $Zr(NO_3)_4$, Cr nitrate, phosphotungstic acid, uranyl nitrate, phosphomolybdic acid and $Th(NC_3)_4$.

Twenty per cent of the following was tried. $MgSO_4$, $Mg(OAc)_2$, $MgCl_2$, $Mg(NO_3)_2$, $Co(NO_3)_2$, $Ni(NO_3)_2$, and $Na_2CO_3$.

Fifty per cent of $Mg(OAc)_2$ was employed.

From 0.45 to 2.0% of the following were tested: $Mg(OAc)_2$, $Fe_2O_3$, $ThO_2$, $Th(NO_3)_4$, $K_2CO_3$, metal $(AsO_4)_2$, $WO_3$, $Al(OH)_3$, $Cr(OH)_3$, $ClCl_3$, $AlCl_3$, $HgCN_2$, $K_2CrO_4$, $Al(OAc)_3$, $Mg_3(AsO_4)_2$, $V_2O_5$, $Zr(NO_3)_4$, $K_2CO_3$ and $Th(NO_3)_4$.

The following combinations of materials were tried as catalysts:

$Mg(OAc)_2 + V_2O_5$    $Mg(OAc)_2 + WO_3$
$Mg(OAc)_2 + Th(NO_3)_4$    $Mg(OAc)_2 + Zr(NO_3)_4$
$Mg(OAc)_2 + K_2CO_3$    $Mg(OAc)_2 + Be(NO_3)_2$
$Mg(OAc)_2 + Ce(NO_3)_2$    $Mg(OAc)_2 +$ heavy metal acetate
$Na(OAc) + (NH_4)_2MoO_4$    Mg oxalate $+ Co(NO_3)_2$
$MgCrO_4 + K_2CO_3$    Mn salts $+ K_2CO_3$
$MgCrO_4 + Co(NO_3)_2$
$MgCrO_4 + Co(OAc)_2$
$MgCrO_4 + K_2CO_3 + Co(OAc)_2$
$MgCrO_4 + Ni(OAc)_2$
$MgCrO_4 + Ni(OAc)_2 + K_2CO_3$ A number of combination catalysts of MgO were prepared with at least one of the following materials: Co, $Ba(OH)_2$, $Fe_2O_3$, $H_3PO_4$, $ThO_2$, $V_2O_5$, $WO_3$, $Ce(NO_3)_2$, AgO, Cd, Ag, Cu, Co.

The aforementioned catalysts were prepared by the following methods:

A. To 100 g. of silica gel was added an aq. acid solution prepared by adding 15 cc. of strong acetic acid to 35 cc. of water, followed by gentle warming and the addition of 10 g. of ZnO, MgO, $NiCO_3$, CdO or any other basic oxide or carbonate or hydroxide of the desired metal. Any excess liquid was removed by heating either with or without reduced pressure.

B. To 100 cc. of silica gel treated as above was added 10 g. $H_2SO_4$ diluted to 30 cc. with water. By this procedure the above acetates were completely converted to the corresponding sulfates precipitated directly on or within the pores of the gel.

C. To 100 cc. of silica gel was added 10 g. $H_2SO_4$ to which had been added 25 cc. $H_2O$. To this gel so treated was added the aq. acid solution of the metal salt as prepared in (A). This accomplished essentially the same results as (B) but produced a more active catalyst.

D. Similar procedures were followed in preparing chromates, phosphates, molybdates, etc.

The other catalysts described above may be prepared by the same general steps A, B, C already set forth. It is to be understood that while in the process examples sulphuric acid and other such specific agents have been described, other inorganic and organic acids or chemicals may be employed. For example, in place of the sulphuric acid, phosphoric could be employed.

While in the above examples in many instances the impregnating or mixing metal or metal salts was employed in amounts from .45% to 5 or 10%, it will be observed that amounts as high as 50% were employed. Therefore, while we prefer a base impregnated or mixed with a minor proportion of a metal or metal salt, we do not wish to be restricted to these embodiments inasmuch as the proportions may be varied. We have also found that the silica gel and alumina gel may be mixed in varying proportions.

For convenience, we designate our catalysts generically as "dehydrating catalysts." The combination catalysts comprising supports such as gels, charcoal, magnesia, or the like, impregnated or mixed with the various metals and metal salts specified, we sub-generically designated as "impregnated" or "mixed dehydrating catalysts."

However, while the foregoing represents the preferred filling or packing material for the reaction space, as will be pointed out in more detail hereinafter, the reaction space may be filled with some relatively inert non-catalytic material such as sea sand or metal gauze, or pelleted materials, or the tube might be filled with brick, porcelain, or other means for deflecting the reactant gases against the sides of the reaction space for better heat absorption. In the event that inert materials are used, or a narrow, unfilled reaction space employed, higher temperatures would be applied to the reaction space than, for example, where an active catalytic filling material was present in the reaction space.

From the foregoing it is also readily apparent that various combinations of materials can be employed. For example, inert materials, such as sea sand or other non-catalytic materials, may be coated or mixed with catalytic materials and employed in the reaction space as filling.

The carrying out of our new process will be more apparent from the following general example which is set forth for the purpose of broadly illustrating our process:

In carrying out this example the carbonyl compound to be reacted was an aldehyde. One container was filled with relatively pure liquid acetaldehyde. Another container was filled with formalin. The two materials were allowed to flow to a mixing point and then into a vaporizer or flash unit. The mixture of acetaldehyde and formalin was vaporized and the vapors conducted to a packed reaction space, as referred to above. In the particular instance under consideration, the reaction space was filled with a catalytic material. However, it is to be understood our invention is not exactly limited in this respect because any of the filling materials or combinations thereof might be substituted wholly or in part for the catalytic material employed in this example. The filling material in the reaction space was electrically heated by means of a coil surrounding the reaction chamber.

During a run of about six hours, approximately 101.3 grams of formalin containing approximately 35% formaldehyde by weight, were fed to the reaction space. The filling materials in the reaction space, in this example, were held at approximately 285° C. After a period of operation, which may be from, for example, twelve to twenty-four hours, the filling material may be removed and fresh material introduced, or the removed material may be regenerated or otherwise renovated and returned.

The reaction product in this example contained a substantial amount of acrolein which was drawn off and the acrolein may be hydrogenated, oxidized, polymerized, or otherwise treated, a step of further treating the acrolein being described in greater detail in our Patent 2,150,158.

For convenience of reference, other examples of operating our process are set forth below in tabular form. It is to be understood that in these examples similar procedure to that outlined above is followed, except that in the runs described in the table a relatively inert non-catalytic material was placed in the reaction space and the two different carbonyl compounds reacted in the presence of this heated inert material.

| Run No. | Temperature range | Feed ratio $CH_2O/AcH$ | Space velocity | Catalyst data and/or filling material | |
|---|---|---|---|---|---|
| | | | | Support | Filling |
| | °C. | | | | |
| 106 | 300 | 0.451 | 1,140 | Monazite sand | None. |
| 24 | 266 | 0.66 | 750 | Activated carbon. | Do. |
| 26 | 297 | 0.5 | 750 | Activated charcoal. | 5% $NA_2CO_3$. |
| 6-74 | 320 | 0.24 | 1,200 | Sea sand | None. |

The above described reactions are merely illustrative and it is to be understood that in place of the catalyst and/or filling materials described, various other substances might be substituted, as for example, broken brick, porcelain, metal gauze, pelleted material, and the like. Also, the reactions have been illustrated by the employment of the carbonyl compounds, formaldehyde, and acetaldehyde as these compounds represent certain of the lowermost members of the groups of our reactants. However, as will be described in greater detail hereinafter, various other carbonyl compounds may be substituted in the foregoing reaction.

In our process it is possible to use carbonyl compounds from various sources. For example, the acetaldehyde may be obtained synthetically from acetylene. The acetylene may be produced from calcium carbide, cracking hydrocarbons or the decomposition of hydrocarbons in an electric arc. The acetaldehyde may also be obtained from ethyl alcohol.

It will thus be apparent that the purity of the acetaldehyde is not important.

Relatively pure formaldehyde boils at approximately −21° C. Formalin, which contains around 40% of formaldehyde, the remainder being principally methyl alcohol and water, is an easier source of formaldehyde to work with. Also formalin is readily available commercially. We have found that the methyl alcohol content of formalin or other sources of formaldehyde does not interfere with our process. Solid para-formaldehyde may be employed. It is, therefore, apparent that our invention embraces various sources of formaldehyde. We also contemplate the added steps of converting methyl alcohol into formalin and feeding the resultant reaction mixture to the reaction.

Assuming that the carbonyl compounds are aldehydes, the following reaction apparently takes place, substantially instantaneously and in a single step:

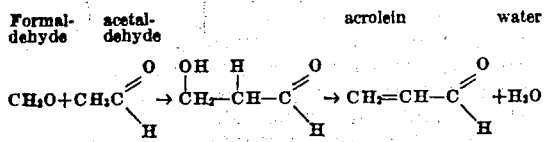

The vapors from the reaction chamber are usually passed through a cooling device. The desired unsaturated carbonyl compound, containing water, any unreacted formaldehyde and saturated carbonyl compound may be withdrawn. The unreacted components may be separated and recirculated if desired.

The unsaturated carbonyl compound may be recovered as such and employed or, the compound may be converted to different chemical compounds by hydrogenation, oxidation, polymerization, or other treatment. Excellent yields of acrolein were obtained.

In place of the acetaldehyde or other higher aldehyde described in the foregoing illustrative examples, other carbonyl compounds may be substituted. Illustrative thereof are the lower aliphatic ketones of the series commencing with acetone, methyl-ethyl ketone, diethyl ketone, and the like. The specific reaction of such ketones forms the subject matter of copending application of Brant and Hasche 280,808, filed June 23, 1939.

Our reaction, which has been specifically illustrated as respects the utilization of aldehydes, may be generically illustrated as follows:

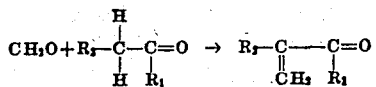

wherein $R_1$ and $R_2$ represent hydrogen, alkyl, aryl, or heterocyclic. For example, when $R_1$ is an alkyl group the carbonyl compound then would be a ketone. When $R_1$ is hydrogen, the carbonyl compound is an aldehyde. It will be observed that our carbonyl compounds are characterized in that the carbon atom adjacent the carbonyl group will contain at least two hydrogen atoms. We have found that in such a configuration that the two hydrogen atoms on the adjacent carbon atom are apparently activated to some extent by the carbonyl group when the reaction is in the vapor phase, and therefore readily combine, for example with formaldehyde.

We also contemplate that the unsaturated compounds in the reaction product from our aldehyde reaction may be further treated and/or copolymerized or otherwise reacted with the various reaction products obtained from our reaction resulting from the use of a carbonyl compound other than aldehydes, as ketones.

The above examples are merely illustrations of conditions for carrying out our processes. The reaction conditions may be varied and the above examples are not to be construed as limiting our invention. For example, the mole ratio of the second carbonyl to the first carbonyl (as acetaldehyde to formaldehyde), while generally kept within the range of from 5–0.5 may be varied outside of these limits. The high ratio is desirable because the yield based on formaldehyde is smaller than the yield based on the other carbonyl compound and we have found that a more complete utilization of the formaldehyde could be obtained by using the higher ratio.

The space velocities for the formation of the unsaturated compounds may vary according to conditions and reaction equipment. We have found a range from 200–3000 to be suitable for carrying out our reaction. We may define "space velocity" as cubic feet of reactants fed per cubic foot of filled or packed reaction space per hour—volumes of reactant materials measured at temperatures and pressures of reaction. As already indicated, the temperature range may generally vary from about 200° C. to 400° C. However, in the absence of any catalyst higher temperatures up to 600° C. may be employed. While we prefer to carry out the reaction under atmospheric conditions, it is possible to carry out the reaction under either higher or lower pressures.

Our novel procedure described herein represents a particularly satisfactory method for the manufacture of unsaturated carbonyl compounds. Our preferred embodiment for the manufacture of acrolein and vinyl ketones permits the utilization of materials, such as formalin, and other common materials.

While our process is particularly adapted for the preparation of the unsaturated aliphatic aldehyde acrolein as described in the tables, our invention has wider applications and embraces similar procedure for the formation of other mixed products. An example of the formation of an unsaturated aldehyde with an even number of carbon atoms is the reaction between formaldehyde and propionaldehyde to form a methacrylic-aldehyde.

Our process does not require the utilization of high pressures because the reaction is not accompanied by an increase or decrease in volume. Our process is also particularly desirable from the standpoint that any by-products produced are few in number and in relatively small quantities when our process is properly employed. Any unreacted components may be re-utilized by circulation through the system.

It will be understood that our apparatus will be constructed of suitable materials and that proper precautions for preventing heat losses and leakage will be observed. We find that many of the parts of our apparatus may be constructed of a steel containing about 16–23% chromium, about 7%–20% nickel and the balance substantially iron. This steel preferably has a content of carbon of about $\tfrac{1}{10}$% or less. The steel may also contain small amounts of molybdenum, columbium, copper, silicon, and tungsten.

It is, therefore, apparent that while we have described our invention in some detail, there are many changes that may be made therein without departing from the spirit of the invention.

What we claim is:

1. A process for producing unsaturated aliphatic carbonyl compounds which comprises passing mixed vapors containing formaldehyde and another lower aliphatic carbonyl compound containing only one oxygen atom and no other elements than carbon and hydrogen and having at least two hydrogen atoms attached to the carbon atom adjacent the carbonyl group, into contact with a mixture of relatively inert non-catalytic filling material with a condensation catalyst, at a temperature, at least part of the time, at which the reaction will take place under vapor phase conditions and water is split off, whereby an unsaturated aliphatic carbonyl compound is formed.

2. A process for producing unsaturated aliphatic carbonyl compounds which comprises passing mixed vapors containing formaldehyde and another lower aliphatic carbonyl compound containing only one oxygen atom and no other elements than carbon and hydrogen and having at least two hydrogen atoms attached to the carbon atom adjacent the carbonyl group, into narrow spaces, at a temperature at least part of the time, at which the reaction will take place under vapor phase conditions and water is split off, whereby an unsaturated aliphatic carbonyl compound is formed.

3. A process for producing unsaturated aliphatic carbonyl compounds which comprises passing mixed vapors containing formaldehyde and another lower aliphatic carbonyl compound containing only one oxygen atom and no other elements than carbon and hydrogen and having at least two hydrogen atoms attached to the carbon atom adjacent the carbonyl group into contact with relatively inert non-catalytic filling material, at a temperature, at least part of the time, at which the reaction will take place under vapor phase conditions and water is split off, whereby an unsaturated aliphatic carbonyl compound is formed.

4. A process for producing unsaturated aliphatic carbonyl compounds which comprises passing mixed vapors containing formaldehyde and an excess of another lower aliphatic carbonyl compound containing only one oxygen atom and no other elements than carbon and hydrogen and having at least two hydrogen atoms attached to the carbon atom adjacent the carbonyl group into narrow spaces at a temperature greater than 200° C., at least part of the time, whereby the reaction will take place under vapor phase conditions and water is split off, thereby forming an unsaturated aliphatic carbonyl compound.

5. A process for producing unsaturated aliphatic carbonyl compounds which comprises passing mixed vapors containing formaldehyde and an excess of another lower aliphatic carbonyl compound containing only one oxygen atom and no other elements than carbon and hydrogen and having at least two hydrogen atoms attached to the carbon atom adjacent the carbonyl group into contact with relatively inert non-catalytic filling material at a temperature greater than 200° C., at least part of the time, whereby the reaction will take place under vapor phase conditions and water is split off, thereby forming an unsaturated aliphatic carbonyl compound.

6. A process for producing unsaturated aliphatic carbonyl compounds which comprises heating mixed vapors containing formaldehyde and an excess of another lower aliphatic carbonyl compound containing only one oxygen atom and no other elements than carbon and hydrogen and having at least two hydrogen atoms attached to the carbon atom adjacent the carbonyl group in contact with relatively inert non-catalytic heat distributing material at a temperature greater than 250° C., at least part of the time, whereby the reaction will take place under vapor phase conditions and water is split off, thereby forming said unsaturated carbonyl compound.

7. A substantially single step process for producing unsaturated aliphatic carbonyl compounds which comprises heating mixed vapors containing formaldehyde and another lower aliphatic carbonyl compound containing only one oxygen atom and no other elements than carbon and hydrogen and having at least two hydrogen atoms attached to the carbon atom adjacent the carbonyl group, in packed narrow spaces at a temperature above 200° C., at least part of the time, whereby the reaction will take place under vapor phase conditions and water is split off, thereby forming an unsaturated aliphatic carbonyl compound.

8. A substantially continuous single step process for producing vinyl carbonyl compounds which comprises heating mixed vapors containing formaldehyde and another lower aliphatic aldehyde having at least two hydrogen atoms attached to the carbon atom adjacent the carbonyl group in contact with relatively inert non-catalytic heat distributing material at a temperature above 200° C. at least part of the time whereby the reaction will take place under vapor phase conditions and water is split off thereby forming a vinyl carbonyl compound.

MILTON GALLAGHER.
RUDOLPH LEONARD HASCHE.